Nov. 1, 1960

A. J. DE ROSSET 2,958,391

PURIFICATION OF HYDROGEN UTILIZING
HYDROGEN-PERMEABLE MEMBRANES

Filed April 10, 1958

INVENTOR:
Armand J. deRosset

BY: Chester J. Giuliani
Donald E. Moehling
ATTORNEYS

United States Patent Office 2,958,391
Patented Nov. 1, 1960

2,958,391

PURIFICATION OF HYDROGEN UTILIZING HYDROGEN-PERMEABLE MEMBRANES

Armand J. Derosset, Clarendon Hills, Ill., assignor, by mesne assignments, to Universal Oil Products Company, Des Plaines, Ill., a corporation of Delaware Filed Apr. 10, 1958, Ser. No. 727,622

10 Claims. (Cl. 183—2)

This application is a continuation-in-part of my copending application Serial No. 556,321, filed December 29, 1955, now abandoned, which in turn is a continuation-in-part of application Serial No. 533,870, filed September 12, 1955, now Patent No. 2,824,620, issued February 25, 1958.

This invention relates to the means for and the method of separating hydrogen from a mixture of gases which involves the diffusion of the hydrogen component of the gas mixture through a hydrogen-permeable membrane. More specifically, the invention relates to an apparatus and a method for separating hydrogen in a substantially pure form, the method and apparatus involving the use of a membrane which is permeable only to hydrogen, which is supported by a structurally rigid, porous matrix, and which enables the use of high pressures, high temperatures and high throughput rates of the feed gas without the necessity of frequent replacement of the hydrogen-permeable membrane.

One object of this invention is to provide a method for purifying hydrogen whereby a product stream of high purity is capable of being produced at a high rate of production without the use of bulky or cumbersome equipment. Another object of the invention is to provide an apparatus which will produce a substantially pure hydrogen concentrate from a low-grade hydrogen stream contaminated with other difficultly-condensable gases at a high rate of production, the apparatus being of simple construction and of simple operation.

One embodiment of this invention relates to a process for separating a hydrogen concentrate from a mixture of gases containing hydrogen which comprises passing said mixture at an elevated pressure into a diffusion cell comprising a porous, essentially solid, supporting matrix of sintered metal particles having on one side of the matrix and on the side opposite thereto a continuous, hydrogen-permeable membrane selected from the metals of Group VIII of the Periodic Table in contact with said matrix at its upstream pressure, the pressure of said mixture on the membrane on one side of the matrix thereby tending to cancel out the force vector of the pressure of said mixture on the opposite side of said matrix withdrawing diffused, substantially pure hydrogen at a reduced pressure from the downstream side of said membrane through an exposed portion of said matrix, the surface of said exposed portion being free of said membrane and withdrawing non-diffused component of said mixture from the upstream side of said membrane.

Another embodiment of this invention relates to an apparatus suitable for effecting the separation of hydrogen from a mixture of gases which comprises a housing capable of confining a mixture of gases under pressure and containing a hydrogen-diffusion cell within said housing; a mixed-gas inlet to said housing, a non-diffused gas outlet from said housing, and a diffused hydrogen outlet, said cell comprising in combination: a porous, essentially solid, sintered metal matrix having on one side and on the side opposite thereto a hydrogen-permeable membrane comprising a metal selected from the elements of Group VIII of the Periodic Table, said matrix being sealed by said membrane from said gas mixture and having an exposed portion, free of membrane, in gaseous-flow communication with said hydrogen outlet.

The invention will hereinafter be described in more detail in connection with the accompanying drawing wherein Figure 1 is a cross-sectional view of a portion of a diffusion cell;

Figure 1:
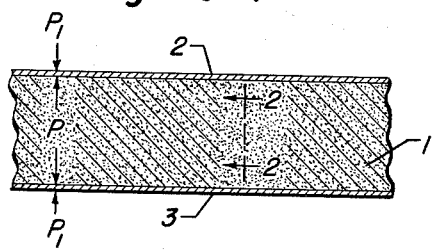

It is well-known that certain metals of Group VIII of the Periodic Table, comprising the metals known as the "iron group" are permeable to hydrogen and substantially impermeable to other gases which may be mixed therewith in the commonly found gas mixtures containing hydrogen. Relatively thin membranes of such metals have heretofore been utilized in suitable equipment to effect at a relatively low rate the separation of hydrogen from other gases. However, it has been found that the use of such thin metallic membranes, such as palladium foil, for this method of separation are limited in their application to low pressures and to relatively small rates of hydrogen production because of the tendency of such thin membranes to rupture upon the application of even slight pressures on the upstream side of the hydrogen-permeable foil. Although palladium has been found to be one of the preferred hydrogen-permeable metals from which to fabricate such gas diffusion elements, other metals such as certain alloys of palladium, and the metals: iron, nickel, copper, platinum and molybdenum, including certain alloys of the latter metals, may be employed to improve the permeability of the membrane to hydrogen without sacrificing purity of the gaseous product or without weakening the structural properties of the membrane. Thus, silver-palladium alloys containing from small amounts up to about 60% of silver, and preferably from about 25 to about 40 atom percent of silver, will increase the permeation rate of hydrogen through the membrane under otherwise similar conditions. Gold-palladium alloys, preferably containing from about 20 to about 40 atom percent of gold, boron-palladium alloys, preferably containing from small amounts up to about 10 atom percent of boron also increase the permeability of a palladium membrane to hydrogen.

In order to provide a membrane which will permit a reasonable throughput rate of the hydrogen-containing gas mixture and thereby permit the production of hydrogen at a feasible or "industrial" rate of production, the resistance to flow of hydrogen through the membrane may be reduced by providing a sufficiently thin foil; alternatively, higher upstream pressures may be utilized to increase the rate of diffusion of hydrogen through the permeable membrane, but accompanying such use of higher pressures is the necessity of providing a membrane of sufficient thickness to withstand the higher pressures, without rupturing the membrane. It has been found, however, that the rate of increase in the resistance to flow of hydrogen through the hydrogen-permeable membrane as the thickness of the membrane increases is greater than the rate of increase in flow through the membrane as the pressure is increased, up to the rupture point. Therefore, an increase in the thickness of the membrane to accommodate higher pressures defeats the purpose of such higher pressures. The processes heretofore developed for employing hydrogen-permeable metal foils, for all practical purposes, are thus limited to low pressures and to low rates of hydrogen production.

Figure 2:
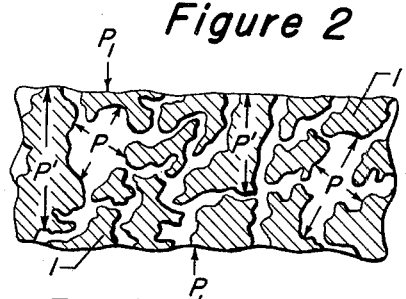
Figure 2 is a diagrammatical illustration of certain forces within the diffusion cell.

The present invention provides a means for separating hydrogen from gas mixtures containing hydrogen by the gaseous diffusion method at a relatively high pressure, accompanied by the use of a relatively thin membrane of the hydrogen-permeable metal, thereby combining the advantages of both a high upstream operating pressure with a thin, hydrogen-permeable membrane, recovering a product stream of substantially pure hydrogen at a high rate of production. This desirable result is achieved in the present device by overlaying a thin, hydrogen-permeable metal membrane on a porous, structurally rigid, essentially solid, porous matrix of compressed, sintered metal particles, having exceptional structural strength and porosity at high cell temperatures and pressures. The particular structural feature of the present device which permits the use of the present diffusion apparatus at exceptionally high upstream pressures with a consequent exceptionally high rate of hydrogen production is the provision for applying the membrane on opposing sides of the matrix, providing for an escape of the diffused hydrogen at a lower pressure from an uncovered or exposed portion of the matrix, thereby eliminating to all perceptible degree leaks in the permeable membrane due to structural deflection of the matrix and the resulting breakage in the membrane as a result of the excessive upstream pressure. These structural features are further illustrated in the accompanying diagram, Figure 1, of which is a cross-sectional view of a portion of a typical diffusion cell provided herein, illustrating the essential elements thereof. Each cell is composed of an essentially solid, porous matrix 1 comprising a mass of sintered metal particles, such as a flat plate, overlain on opposite sides in any one plane by hydrogen-permeable membranes 2 and 3, said matrix being of sufficient structural rigidity to support without reduction in thickness or structural deflection the difference in pressure between the pressure $P_1$ of the mixed gases on the upstream side of each membrane and P the lower pressure of the purified hydrogen within the pores of the matrix on the downstream side of the membrane. It will be evident from Figure 2 that P′, the net internal force on the column of sintered particles comprising the porous matrix, is primarily a vertical vector when the pressure of the feed gas, $P_1$, is applied on both sides of the matrix and that the only force the column must resist is a transverse compressive force equal to the difference between $2P_1+P$ or $2P_1-P$. On the other hand, where the gaseous feed pressure $P_1$ is applied from one side of the matrix only, P′ is not merely a vertical vector but the internal forces within the column of solid comprising the matrix are made up of both vertical and horizontal vectors, giving rise to tensile stresses or horizontal bending moments within the column of sintered particles. In the present process wherein the upstream pressure is applied on both of the opposing sides of the matrix, however, the columns of sintered particles need resist only compressive forces (wholly vertical force vectors), applied from opposing directions on the matrix, no lateral tensile forces exist and the matrix is not distorted in either direction, as long as the columns of sintered particles comprising the matrix withstands the compressive forces. The ability of the matrix in a hydrogen diffusion cell to maintain its structure when the upstream pressure is applied on both of the opposing sides of the matrix, contrasted with the structural instability of the same matrix having pressure applied on only one surface arises from the fact that the latter matrix on the upstream side is distorted (concave deflection) by relatively slight pressures, whereas the former will tolerate pressures in the extreme pressure range, several hundred times greater than the pressure tolerance of the latter.

The membrane-supporting matrix is fabricated from a porous material having sufficient surface area surrounding the open pores to support and maintain the continuity of the membrane at all points on the membrane exposed to the feed gas at elevated pressure on the upstream side of the membrane. In a preferred form, the matrix is a so-called "porous metal" composed of sintered, compressed particles of metal fabricated into a plate or rod of substantial thickness. The particular advantages of sintered metal particles as a matrix support for the membrane is its great structural strength and rigidity. Also an important property of sintered metal powders is its ease of manufacture into desired shapes and the fact that the metal membrane may be readily welded to the surface of the matrix, thus simplifying the fabrication of the diffusion cell therefrom.

The porous matrix, fabricated from sintered metal particles, is generally manufactured by partially fusing a mass of the metal in powdered or finely divided condition under compression. Thus a plate or cylinder fabricated from powdered iron may be formed by compressing a mass of iron particles retained within a confining enclosure at a temperature near the melting point of the iron, the particles generally being compressed in an hydraulic press capable of exerting pressures of from 5000 to about 100,000 pounds per square inch. One of the preferred metal powders from which to fabricate the matrix is powdered stainless steel. Other metal powders such as zinc powder, tin and copper dust, powdered nickel or cobalt, and a variety of other metals may be utilized to form the matrix, depending upon the use of the cell, the metal being supplied to the sintering press in a size range varying from finely powdered to coarsely pelleted form, individual particles of which may vary in size from 0.1 to about 800 microns, preferably from about 1.0 to about 100 microns, in diameter. The size of the particles of metal in any event must be sufficient to produce a membrane-supporting matrix having pores which will permit the free passage of molecular hydrogen through the resulting matrix in a direction parallel to the surface of the membrane and the plane of the matrix.

The use of sintered metal, porous matrices in the fabrication of the present hydrogen diffusion cells are advantageous for many substantial reasons. Thus, porous ceramic materials do not withstand pressure applied normally to their surface, especially when applied to small areas, such as the area under gaskets, etc.; ceramic supports are therefore readily crushed when an attempt is made to fabricate high pressure equipment therefrom in a form commonly utilized in the art for high pressure vessels. Since the rate of separation is dependent upon the ultimate differential between the upstream and downstream pressures, a differential which all portions of the diffusion cell, including its gaskets and seals, must withstand, it can be seen that the use of a ceramic matrix limits to a much greater extent the operating pressure, and hence, the rate of diffusion, than a porous sintered metal matrix having much greater crushing resistance. Further, the use of a metallic matrix facilities the fabrication of a diffusion cell because of its mechanical and physical properties. Thus, for example, a pressure-tight seal between the surfaces of adjacent, movable parts may be established between metallic surfaces much more readily than between metal-ceramic or metal-resin or plastic surfaces, as for example, when surface pressure is applied to a gasket between said surfaces, a sintered metal matrix has greater crush resistance than a ceramic or plastic matrix. Since the diffusion cell is customarily made primarily from metallic pieces, there is no differential in the thermal expansion between a metallic matrix and a metallic sealing flange, for example, as would be the case in a metal flange-ceramic matrix. In other respects, such as its superior machinability, weldability and, in general, its greater fabricability, as well as its greater resistance to warpage, its readily controllable porosity and its generally greater inertness to the hydrogen-containing gas stream to be separated make the use of sintered metal porous matrices outstandingly advantageous in comparison with ceramic, plastic, and many other thermo-plastic materials.

which the gaseous mixture may flow unpermeated. The required thickness of foil, in general, depends upon the size of the pores in the matrix background and is also determined by the desired rate of diffusion, which is inversely proportional to the thickness of the foil and varies directly with the partial pressure of the hydrogen component and the temperature of the gaseous mixture impressed on the upstream surface of the foil. Since these are mutually dependent factors, each must be determined by choice to provide optimum separation in the particular system involved.

The thin foil applied to the matrix may, for example, be a foil having a thickness of from $4 \times 10^{-6}$ to about $4 \times 10^{-4}$ inches in thickness (approximately $1.0 \times 10^{-1}$ to about 10 microns). When it is desired that the thickness of the membrane be increased gradually by the application of successive layers of foil on the upstream surface of the matrix plate, the foil is preferably thin, such as foil of 0.1 micron thickness. Instead of applying the foil by the application of fluid pressure to adjacent layers of foil previously applied, the foil may be pressed into the pores of the matrix by burnishing after each application. In general, in preparing this type of layered membrane, it is preferred that the pores of the matrix be substantially of uniform size and that the pore diameter be not greater than about 100 microns.

Figure 3:
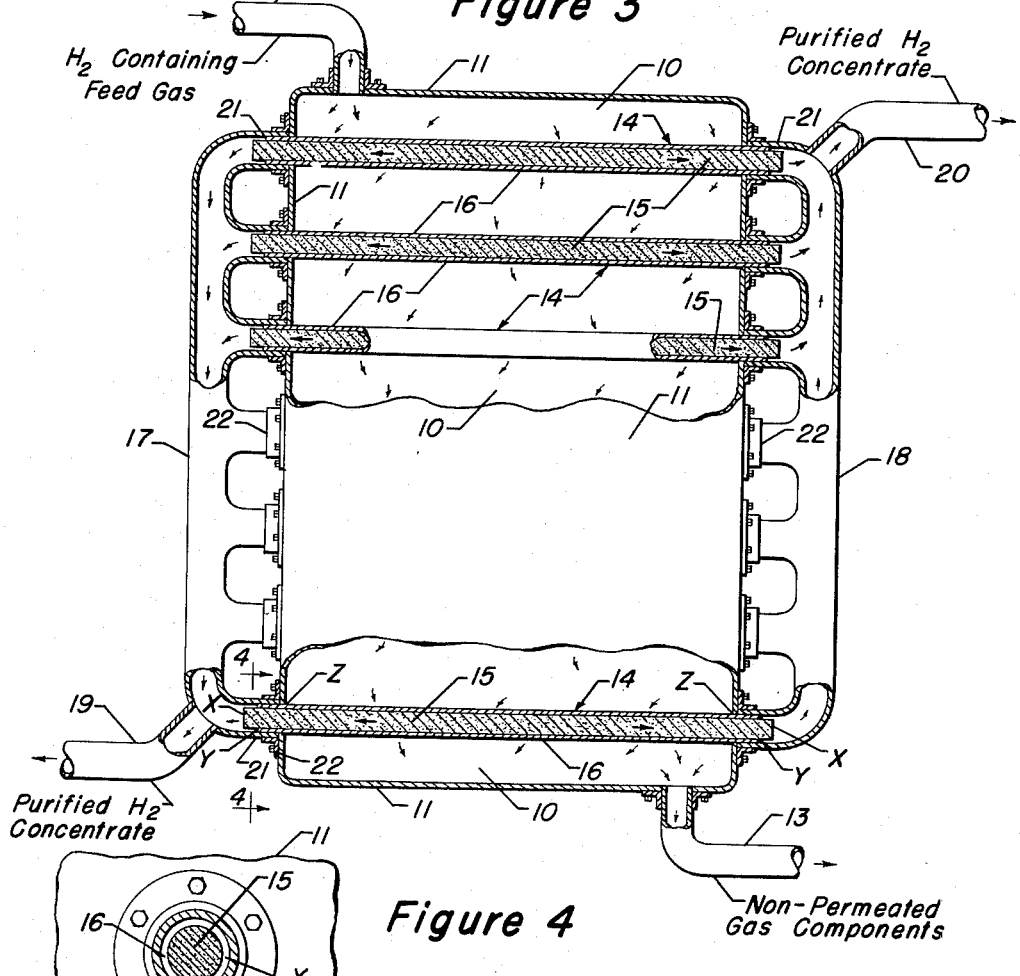
Figure 3 is a sectional view of an apparatus embodying the principles of the invention.

Figure 3 illustrates a typical arrangement of a type of apparatus utilizing a foil of the hydrogen-permeable metal as the membrane in the present gas diffusion process. Referring to this figure which is a sectional view of a typical gas diffusion cell 10, applying the principles of this invention, for example, in the form of a working model thereof, the cell consists of a number of hydrogen diffusion units connected in parallel to a manifold which acts as an accumulating duct for the diffused hydrogen product (diffusate). The unit illustrated in Figure 3 comprises a housing 11 capable of retaining the feed gas mixture at the desired operating pressure, an inlet pipe 12 for the feed gas mixture containing hydrogen and an outlet pipe 13, generally on the opposite end of the housing, for the non-diffused components of the feed gas mixture and a series of gas diffusion elements 14 which may be a series of cylinders, placed, for example, in staggered relationship within the housing or, more preferably, a series of horizontally disposed plates made up of porous matrix 15 overlaid on all surfaces exposed to the feed gas mixture, or containing in its internal structure, a hydrogen-permeable membrane 16, in accordance with the concept of a membrane herein defined. These elements, comprising the aforementioned matrix and membrane, are hermetically sealed to the internal walls of the housing, such that the entire surface of the membrane exposed to the feed gas mixture and in contact with the porous matrix is sealed against the escape of feed gas into the porous matrix. Each plate or cylinder of porous matrix, however, has an exposed or "open" end of matrix material free of membrane through which the diffused hydrogen product may flow, unimpeded by membrane, into the manifolds 17 and 18 at each end of the series of diffusion elements placed within the housing. The manifolds 17 and 18, in turn, connect with respective hydrogen-transfer pipes 19 and 20, leading to the point of ultimate use of the purified hydrogen product. The resistance to flow of the diffused hydrogen stream through each of the diffusion elements increases as the length of the cylinder or plate of porous matrix increases; hence, the length of each element is preferably maintained at a minimum for a given rate of hydrogen production in order to reduce the resistance of diffusate flow to a minimum. The production of diffusate is maintained at a high level, preferably by increasing the surface area of membrane exposed to the feed gas mixture, for example, by increasing the number of such elements in the unit connected in parallel to the manifold at each end of the elements or by increasing the surface area (membrane area) of the element by the choice of its geometric form. Thus, a flat plate contains a greater proportion of surface area per volume of matrix than a cylinder, for example. The feed gas mixture is appropriately charged into the apparatus at an elevated temperature within the range of from about 150° to about 1500° F. in order to increase the rate of diffusion, a particularly preferred range being above about 200° F., up to about 1000° F. The pressure of the feed gas mixture on the upstream side of the membrane must be sufficient to maintain a positive value for the hydrogen partial pressure differential between the upstream and downstream sides of the membrane, the latter being the internal pressure within the matrix. Thus, it is preferred that the hydrogen partial pressure differential between the gas mixture surrounding each of the diffusion elements and the hydrogen pressure in the matrix on the downstream side of the membrane be at least 10 pounds per square inch, and may be as high as from 10 to several hundred atmospheres, in order to obtain a positive flow of hydrogen from the upstream side of the hydrogen-permeable membrane into the manifolds.

Figure 4:
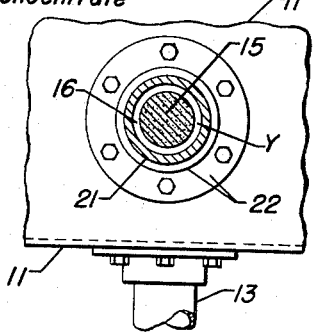
Figure 4 is a cross-sectional view taken on the line 4—4 of Figure 3.

The manner of fixing the diffusion element into the apparatus is illustrated in Figure 4, which is a cross-sectional view of the conduit connecting the manifold 17 with the lowermost diffusion cell, illustrating the porous matrix and membrane beyond the internal portions of the housing. Thus, the conduit 21 is fastened into a flange 22 hermetically sealed into the side of the housing 11. The conduit carries an extension of the matrix 15 and membrane 16 from the internal portions of the housing, the extension ending at the point "x" beyond the housing wall, with the uncovered end of the matrix, free of membrane, projecting into the conduit. The membrane 16 may also extend into the conduit, but to a distance short of the end of the matrix, for example, to the point "y," membrane 16 and all other membrane elements within the apparatus, being sealed to the housing wall at the point "z" to thereby prevent the escape of feed gas into conduit 21, which would be accompanied by a resulting contamination of the desired hydrogen product.

A simulated foil membrane which has certain advantages in its use over a continuous foil, above illustrated, the advantages thereof generally arising in the ease of preparing the same and the mechanical stability of the resulting membrane, may be formed by dusting the surface of the porous matrix with the hydrogen-permeable metal in powdered form, utilizing a quantity of the powdered metal sufficient to reduce the perviousness of the resulting metal film to the non-hydrogen components of the gas mixture to the desired level. Thus, palladium powder may be placed on the surface of the porous matrix and thereafter burnished or polished to form a more continuous film over the pores of the supporting matrix. Another convenient method of placing a hydrogen-permeable metal film on the surface of the porous support, the method being one of the preferred means for fabricating the hydrogen-permeable membrane when a sintered metal powder plate is utilized in the apparatus, comprises electroplating the desired hydrogen-permeable metal or alloy on the upstream side of the porous support. Thus, palladium may be readily electroplated on the surface of a sintered stainless steel powder plate by methods and procedures well-known in the electroplating art. The electroplating process may be continued and the continuity of the hydrogen-permeable metal layer on the porous support developed to a degree sufficient to reduce the perviousness of the resulting membrane to the non-hydrogen components of the feed gas to the desired level. An alloy of the hydrogen-permeable metal such as a platinum-silver alloy may also be electroplated directly upon the porous plate.

The method of depositing a membrane which comprises condensing the desired hydrogen-permeable metal from vapors of the same directly onto the surface of the cool, porous matrix is a very effective means of applying extremely thin layers of membrane when the In the production of sintered metal particle matrices the powdered metal must generally be heated or a combination of both heat and pressure must be utilized to form a matrix of the required structural rigidity, while retaining the desired porosity. Thus, certain powdered stainless steels may be fabricated into a porous cylinder by applying an electric current of high amperage to a mass of the powdered metal packed into a ceramic pipe, fusion of the powdered particles taking place at the boundaries of each of the particles where the electrical resistance is the greatest and local temperatures attain the melting point of the metal. Thus, powdered copper or a copper-beryllium alloy may be readily fabricated into a porous metal matrix by heating to a temperature of from about 1000° to about 1900° F. a mass of powdered copper placed between the faces of a press capable of exerting moderately high pressures, the resulting matrix being suitable for preparing a diffusion cell to separate gas mixtures comprising hydrogen and low molecular weight hydrocarbon gases or hydrogen-nitrogen mixtures. Sintered stainless steel matrices may be utilized for separating corrosive gas mixtures such as mixtures of hydrogen and sulfur trioxide. In specifying herein "an essentially solid" porous matrix, it is intended that such characterization define a matrix substantially free of void spaces within the body of matrix larger than the pores which are present in the matrix by virtue of its fabrication from compressed, discrete particles of metal, thereby eliminating matrices having large hollow spaces in their internal structure, such as pipe and masses containing "blow holes," etc.

In most instances, the opposing sides of a matrix will be two parallel sides, such as the parallel, flat surfaces of a plate, one of the preferred structural forms of the matrix. In other instances, such as a cylindrical rod of circular cross-section, there is theoretically no opposing sides (the outside surface of the rod, going continuously around the peripheral circumference, is all one side); however, in such instance, the "opposing sides" of the matrix (as contemplated in the present invention) are the opposing, tangentially parallel surfaces of the cylinder, thereby including the entire longitudinal surface of the cylinder. It will be noted that in each instance, whether the opposing surfaces of the matrix be parallel, convex, concave, or of irregular shape, at any point on either and on both surfaces a vertical force vector directed toward the center of the matrix will result, unless the membrane is deposited on a surface at right angles to such centrally directed vector. From the opposing side there will similarly be a centrally directed force vector which will at least partially negate the opposing vector from the other side of the cell (i.e., the opposite side). It is intended herein, when specifying a membrane deposited on opposing sides of the matrix, that such designation refer to membranes geometrically situated with respect to each other as to give rise to opposing force vectors when the upstream pressure is applied to the cell, whether such membranes be on diametrically opposed sides of a cylinder, or on opposing sides of a flat plate.

Any suitable method for fabricating a hydrogen-separation cell may be employed which will provide for collecting the diffused hydrogen component of the gas mixture in a separate zone from the non-diffusible components of the mixture and removal of the non-diffused components from the upstream side of the membrane (i.e. from the side on which the feed gas is supplied). The basic requirement in fabricating an apparatus for this purpose is the provision of a continuous hydrogen-permeable membrane across every pore on the opposing sides of the supporting matrix. This may be provided essentially by the method of at least partially filling or sealing off the pores of the supporting matrix with the hydrogen-permeable metal, either by superimposing a continuous foil of a hydrogen-permeable metal on the upstream side of the matrix or by incorporating a discontinuous series of hydrogen-permeable metal particles within the porous structure of the supporting matrix, the number of pores within the matrix sealed by the metal particles being sufficient to provide a discontinuous passage to the non-hydrogen components of the gas mixture. Methods for fabricating a suitable separation unit to produce substantially pure hydrogen are numerous, the preferred procedures involving the formation of the membrane in or on the surface of the matrix, or by applying a superficial layer of a prefabricated membrane (such as a foil) to the surface of the matrix. In order to maintain the permeability of the hydrogen-permeable membrane at a higher level and thereby permit the use of high feed stock charging rates, a minimum quantity of the hydrogen-permeable metal for constructing the membrane is preferably used, the quantity, however, being sufficient to fill enough pores of the porous matrix to prevent the leakage of non-hydrogen components through the matrix. The hydrogen-permeable membrane in or on the upstream side of the porous matrix is preferably as thin as possible, but of sufficient thickness to provide a membrane of the requisite strength to maintain its continuity across the pores of the matrix. The transport of hydrogen through the membrane essentially involves the dissolution of the hydrogen in an atomic state in the metal and the subsequent diffusion of the dissolved atoms of hydrogen into the zone of reduced pressure on the downstream side of the membrane (i.e. into the matrix). Accordingly, the rate of hydrogen diffusion is inversely proportional to the thickness of the membrane.

When referred to herein, the term "membrane" is intended to designate a continuous foil or film of the hydrogen-permeable metal or a discontinuous series of particles of the metal, providing a number of membrane elements distributed in the matrix support, said elements being impervious to or capable of forming a barrier to the passage of the non-hydrogen component or components of the gas mixture. Thus, the membrane may consist of a series of minute particles of only fractional micron thicknesses distributed at various levels in the porous matrix, and which, taken together, over the transverse area of the matrix presents an impervious barrier to the non-permeable gaseous components. Although such particles fill the pores at various levels and in the aggregate across the surface of the matrix constitute a discontinuous layer, broken at intervals by the solid portion of the matrix surrounding the pores, the membrane formed thereby is actually "continuous" viewed from a point perpendicular to the surface, also being continuous from the standpoint of forming an impenetrable barrier to the passage of the non-permeable components of the gas mixture. When referred to herein as a continuous layer of permeable metal, membranes formed by discrete particles in the pores of the matrix are intended to include such compositions. The term "porous" as utilized herein, indicates a structural condition in which spaced voids or interstices are disposed throughout a solid mass and in sufficient number and continuity to permit fluid (hydrogen) flow through the mass, while the term "permeable" is intended to characterize a condition which permits diffusion or transport of the hydrogen through the membrane.

A number of methods may be employed to form the hydrogen-permeable membrane comprising the diffusion apparatus of this invention. Thus, a relatively thick hydrogen-permeable foil, for example, a foil of from 0.5 to about 20 microns in thickness may be placed on the surfaces of the opposite sides of a porous plate constituting the matrix or membrane support and the resulting combination placed in the diffusion cell as the hydrogen-permeable element of the apparatus. The thickness of the foil in this modification of the present apparatus should be only sufficient to withstand the pressure differential between the upstream and downstream sides of the foil, without rupturing the foil discs over each of the surface pores which could form fissures or apertures through latter are desired. The membrane when placed on the matrix by vapor condensation thereon, occurs as a uniform layer and when desired, the film may be made into any desired degree of thickness by continuing the vaporization and condensation until the desired thickness is obtained. The vaporization of the metal and condensation of the film is generally effected at reduced pressure, in accordance with techniques developed by the art.

Other suitable methods of applying a superficial layer or modified foil of the hydrogen-permeable metal on the upstream side of the porous matrix may be employed, said methods being described in greater detail in my Patent No. 2,824,620, issued February 25, 1958.

It is evident that two or more hydrogen diffusion cells of the present type may be connected in series, with or without intermediate compressors between each of the cells in order to recover the maximum amount of hydrogen from a given charge of feed stock by subjecting the diffusate from one cell to additional treatment in succeeding cells or by subjecting the non-diffused effluent to additional hydrogen diffusion treatments.

The method of separation provided herein may be adapted to many types of feed stock, including corrosive mixtures as well as substantially inert-mixtures of hydrogen-containing gases. Thus, hydrogen may be recovered from mixtures containing low molecular weight hydrocarbons such as methane, ethane, ethylene, etc. Thus, for example, the non-condensable gases formed in the thermal or catalytic cracking of petroleum crudes or dilute hydrogen-containing gas streams, such as the lean gas effluent of an absorber operated in conjunction with a catalytic cracking process may be used as feed stocks; these may contain as low as fractional mol percentages of hydrogen. Another typical source of a hydrogen-containing gas stream as a charging stock to the present process for effecting the purification of the hydrogen therein is a hydrogen-nitrogen mixture obtained by autothermic reaction of a methane-steam-air mixture, followed by absorption of the carbon dioxide component of the resulting gaseous mixture in an aqueous caustic solution. The hydrogen-nitrogen mixture may contain any concentration of hydrogen. Still another use of the present method of purifying hydrogen is the enrichment of the recycle hydrogen stream of a hydrocarbon reforming process. The hydrogen-containing recycle gas mixture recovered from the non-condensable gaseous product of the reforming reaction is generally contaminated with such gases as hydrogen sulfide and methane and the recycled gas is preferably purified of such contaminants prior to recycle thereof to the reforming reaction zone, the present process providing a convenient means of effecting such purification.

It is to be noted that although any hydrogen-containing mixture of gases may be utilized as feed stock herein, the greater the concentration of hydrogen in the feed gas, the more rapid the rate of production, since the non-hydrogen components build up less rapidly on the upstream side of the hydrogen-permeable membrane. But even in the case of a feed stock containing a high concentration of hydrogen, a method of removing the non-diffused gas component from the upstream side of the membrane must be provided, for example, by withdrawing a small "bleed stream" from the upstream side of the membrane, the latter containing a larger quantity of the non-hydrogen component or components than the feed gas. The bleed stream may be subjected to additional separation, if desired, to increase the total recovery of hydrogen from a given quantity of feed gas. The progressive purification of a stream of hydrogen-containing feed gas, utilizing the residue of non-diffused gases from one diffusion element as the feed to a succeeding element is provided in the apparatus above described by charging the initial feed gas into one end of the apparatus and removing a final non-diffused gas stream from the other end of the unit, the non-diffused mixture flowing from one segment of membrane or from one element of a series of elements to a next succeeding segment or element in the series, the concentration gradient of hydrogen in the gas approaching each element becoming smaller at each step until the non-diffused residue of the feed gas is removed from the conduit at the downstream end of the diffusion zone. It can be advantageous, in order to maintain the flow of hydrogen in sections of the apparatus where the hydrogen partial pressure gradient across the membrane is normally small, to inject into the downstream conduit at such points of low hydrogen partial pressure gradients, a gas which may be subsequently readily separated from the pure hydrogen product, such as superheated steam, to thereby increase said gradient and also to provide a sweep gas or carrier stream which increases the liner velocity of the hydrogen stream at such points.

This invention is further illustrated with respect to certain specific embodiments thereof in the following examples which indicate merely a few of the preferred methods of fabricating a hydrogen diffusion cell, all in accordance with the present invention and which also indicates the character of the results obtainable thereby, the examples being intended merely for illustrative purposes only and not as embodying limitations on the scope of the invention.

*Example I*

A hydrogen diffusion cell in simplified form containing a single diffusion element is fabricated in accordance with the following procedure. A porous cylinder measuring 36 inches long and one inch in diameter is utilized as a membrane-supporting porous matrix, the cylinder consisting of sintered particles of stainless steel powder (18% chromium, 8% nickel steel) molded into cylindrical form by heating and compressing powdered stainless steel comprising particles of about 10 microns average diameter near the melting point of the stainless steel in a mold of the size desired. The cylinder is fitted into a housing consisting of a 3-inch I.D. pipe 30 inches in length having caps threaded on each end into which 1-inch I.D. pipe is tapped, the cylinder being hermetically sealed against the internal surface of the 1-inch pipe with a plastic sealing compound, the cylinder projecting into the 1-inch pipes approximately 3 inches. The housing also contains a ½-inch pipe fitted into each of the caps, the latter pipes providing lead-in and effluent lines for the feed gas mixture. In the following example, the cylindrical matrix of sintered stainless steel particles have pores which average from about 2 microns to about 10 microns in diameter. When placed in the housing and sealed into the end caps, the cylinder without any membrane in place allows approximately 43 cubic feet per hour of a mixture of 25% hydrogen and 75% nitrogen to pass through the cylinder at an upstream pressure of 10 p.s.i.g. The ends of the porous stainless steel cylinder indicated above are thereafter coated with wax to seal off the pores and the exposed surface of the porous cylinder palladium-electroplated to a depth of 0.0008 inch of palladium. The wax is thereafter dissolved from the ends of the rods to provide exposed ends of uncoated porous cylinder. The surface area of palladium between caps is approximately 0.65 square feet when the thus plated cylinder is replaced in the diffusion cell. In a test of the resulting unit for the separation of hydrogen from a mixture of 65 mol percent hydrogen and 35 mol percent nitrogen, the cell is capable of producing hydrogen of 99+percent purity at a rate of 14.0 s.c.f./hr./ft.$^2$ of palladium surface (.05 volume per volume of feed gas), at a feed gas temperature of 650° F. and at a pressure differential of 100 lbs./in.$^2$ between the upstream and downstream sides of the membrane (the feed gas being supplied at a pressure of 100 lbs./in.$^2$ and the diffusate being withdrawn at atmospheric pressure), a non-diffused bleed gas stream containing about 30 mol percent hydrogen is withdrawn from the upstream side of the membrane at a rate of 1.0 volume per volume of diffusate. It is found that the diffusion rate in s.c.f./hr./ft.² of palladium membrane at 650° F. feed gas temperature is approximately directly proportional to the pressure differential in pounds per square inch. At 300 lbs./in.² pressure differential between the feed gas and diffusate, for example, the diffusion rate is approximately 300 ft.³/hr./ft.² of membrane.

Through the same membrane, the effect of temperature of the feed gas mixture (65% hydrogen, 35% nitrogen) on the diffusion rate or rate of hydrogen production varies in accordance with the following relationship:

$$D \alpha e^{-1/Tabs}$$

where D is rate of diffusion in s.c.f./hr.

Thus, at 650° F. and at 310 pound per square inch pressure differential, the rate of diffusion is about 51.2 s.c.f./hr./ft.²; at 710° F. and at the same pressure differential, the diffusion rate is about 89.5 ft.³/hr./ft.²; at 850° F., the diffusion rate is about 300 ft.³/hr./ft.².

*Example II*

In a run similar to the above, except that a sintered metal powder cylinder of the same dimension as the cylinder utilized in Example I, but having a palladium film 0.0006 inch thick deposited onto its outer surface by vaporization of palladium in an electric arc in accordance with established techniques of vapor deposition, is utilized in the diffusion cell. Utilizing the same feed gas mixture (65% nitrogen, 35% hydrogen) supplied to both of the upstream sides of the palladium-coated cell and hydrogen being withdrawn from the uncovered peripheral edge of the element, the rate of hydrogen production is considerably greater than the rate of diffusion realized in the preceding run at the same pressure and temperature conditions.

*Example III*

The advantages of utilizing a diffusion cell in which both sides of the matrix contain a hydrogen permeable membrane over a cell in which one side only of the matrix contains the membrane is shown in the following comparative runs. In one series of runs (Series A), a diffusion element comprising a porous plate in the form of sintered stainless steel powder is fabricated into a disc 3½ inches in diameter and ⅜₆ inch thickness. Three layers of palladium foil (each of 0.0008 inch thickness) are placed on the disc and pressed onto the surface by rolling. In another series of runs (Series B) a similar disc 3½ inches in diameter and ⅜₆ inch thickness is coated on both sides with three layers of palladium foil each of 0.0008 inch thickness. Each disc is placed in a diffusion apparatus and sealed into the apparatus around a ¼-inch rim of the disc to provide a diffusion element of 3-inch diameter. In the apparatus utilizing the disc A having the palladium membrane on one side only, the feed gas (a mixture of 65 mol percent nitrogen, 35 mol percent hydrogen) is fed into the unit on the side of the disc containing the membrane, and enriched hydrogen is withdrawn from the opposite, uncovered side of the disc. In the apparatus utilizing the disc having the palladium membrane on both sides of the disc (disc B) the feed gas is charged into the apparatus on both sides of the disc and the hydrogen diffusate is withdrawn from the outer peripheral edge of the disc and collected. In the following runs the feed gas is supplied to both units at the same temperature and pressure and the same downstream pressure is maintained in the portion of the apparatus in which the diffusate collects.

At an upstream pressure of 10 lbs./in.² hydrogen diffusate of 99.5% purity is collected from the downstream sides of both discs A and B, but the rate of diffusate production for disc B is about 95% greater than for disc A. at an upstream pressure of 100 lbs./in.², the purity of diffusate from both discs is 99+ percent, but the rate of hydrogen diffusate production from disc B is 75% greater than the rate of diffusate flow from disc A. At 500 lbs./in.² pressure the purity of hydrogen from disc B is 98.5% and the purity of the diffusate from disc A is only 81%, indicating that at the latter pressure the resulting concave distortion of the membrane in disc A has caused a break in the continuity of the membrane, permitting non-diffusable nitrogen to leak through the membrane, the effect of higher upstream pressures being to increase the contamination of diffusate from disc A. As the upstream pressure increases, the rate of diffusate flow from disc B, compared to disc A increases, but is counterbalanced by the increased flow of feed gas through the break in the membrane of disc A. Although the rate of diffusion through disc B is roughly double the rate through disc A as the pressure increases, the resistance to flow of diffusate through the matrix parallel to the membrane becomes the controlling factor, although this effect may be reduced by increasing the thickness of the matrix to thereby provide a larger conduit through which the diffusate flows.

I claim as my invention:

1. The process for separating a hydrogen concentrate from a mixture of gases containing hydrogen which comprises passing said mixture at an elevated pressure into a diffusion cell comprising a porous, essentially solid, supporting matrix of sintered metal particles having on one exterior side of said matrix and on the exterior side opposite thereto, a continuous, hydrogen-permeable membrane comprising a metal selected from the metals of Group VIII of the Periodic Table in contact with said mixture at its upstream pressure, the pressure of said mixture on the membrane on one side of said matrix thereby tending to cancel out the force of the pressure of said mixture on the opposite side of said matrix, withdrawing diffused, substantially pure hydrogen at a reduced pressure from the downstream side of said membrane through an exposed portion of said matrix, the surface of said exposed portion being free of membrane, and withdrawing non-diffused component of said mixture from the upstream side of said membrane.

2. The process of claim 1 further characterized in that said upstream pressure is sufficient to provide a pressure differential between the upstream and downstream sides of said membranes of at least 10 pounds per square inch.

3. The process of claim 1 further characterized in that said diffusion cell is maintained at a temperature of from about 150° to about 1500° F.

4. The process of claim 1 further characterized in that said matrix comprises sintered particles of stainless steel.

5. The process of claim 1 further characterized in that said membrane consists essentially of metallic palladium.

6. The process of claim 1 further characterized in that said matrix comprises a substantially flat, relatively thin plate having said membrane deposited on the two opposing flat sides thereof, and the hydrogen diffusate is withdrawn from the exposed edge of said plate, free of membrane.

7. The process of claim 1 further characterized in that said membrane is a silver-palladium alloy containing from 35 to 40 atom percent of silver.

8. An apparatus suitable for effecting the separation of hydrogen from a mixture of gases which comprises a housing capable of confining a mixture of gases under pressure and containing a hydrogen-diffusion cell within the said housing; a mixed-gas inlet to said housing, a non-diffused gas outlet from said housing, and a diffused hydrogen outlet, said cell comprising in combination: a porous, essentially solid, sintered metal matrix having on one exterior side and on the exterior side opposite thereto a hydrogen-permeable membrane comprising a metal selected from the elements of Group VII of the Periodic Table, said matrix being sealed by said membrane from said gas mixture, and having an exposed portion, free of membrane, in gaseous-flow communication with said hydrogen outlet.

9. The apparatus of claim 8 further characterized in that said membrane comprises palladium.

10. The apparatus of claim 8 further characterized in that said matrix is in the form of a substantially flat thin plate having exposed peripheral edges free of membrane.

References Cited in the file of this patent
UNITED STATES PATENTS 1,174,631    Snelling _____ Mar. 7, 1916